United States Patent Office 2,901,387
Patented Aug. 25, 1959

2,901,387

SOLDERING FLUX COMPOSITION

Gordon M. Forker, Lyndhurst, and Herman F. Ogrinc, Chagrin Falls, Ohio, assignors to General Electric Company, a corporation of New York No Drawing. Application October 29, 1956
Serial No. 618,689

13 Claims. (Cl. 148—23)

This invention relates to soldering flux compositions and more particularly to fluxes suitable for the soldering of lead-in wires to lamp base shells.

Attaching of lead-in wires to the eyelets or pins of lamp base shells by means of a solder presents problems not generally encountered in most other soldering operations. In addition to the requirement for good electrical and mechanical connections, it is important that the surface of the solder be free of any corrosive film or insulating layer. Since the electrical circuit to a lamp is usually completed by a contact with the soldered surface, any coating on that surface tends to increase resistance of the circuit. This problem is particularly acute in the case of the photoflash lamps because of the low voltages used to flash them.

Another special problem encountered in lamp soldering has to do with leakage across the base insulation. In some lamp applications there is a hazard if flux or other material causes a low resistance path across the base insulation. The presence of any corrosive residue on or around the soldered joint is, of course, undesirable in any case. The appearance of the soldered joint is impaired and the build-up of products of corrosion makes for increasingly poor appearance. In addition, residues which are corrosive can eventually damage or disrupt the soldered joint causing lamp failure.

Soldering lead-in wires to lamp base shells must be accomplished at relatively high speeds on automatic equipment. The parts involved are somewhat difficult to solder because they cannot practically be pre-cleaned or tinned. Often the base metals are covered with heavy films of oxide or other materials.

The ideal soldering flux for lamp making applications must be active enough to prepare the base metal for soldering surely and quickly on automatic high-speed equipment. It must leave no residue on or around the solder to impair the surface contact or appearance. It must not reduce the efficiency of the base insulation. It must leave the soldered joint and lamp parts free of the possibility of corrosion when the lamp is in use or storage. It should be safe for handling, in use and on the finished product.

Fluxes presently in general use are usually combinations of zinc chloride and ammonium chloride in water and ethylene glycol or Cellosolve. Special fluxes of this general type have also been developed for applications where non-conducting properties are essential. All of these fluxes leave an unsightly residue. The non-electrolytic or non-conducting fluxes are difficult to use because they are less active in cleaning the base metal surfaces. The zinc chloride and ammonium chloride fluxes leave a corrosive residue which attacks the base metal. They also run over the surface of the insulation and seep into cracks in the glass reducing the efficiency of the insulation.

It is therefore one object of the invention to provide an active flux capable of rapidly preparing the metal of a lamp base shell for high-speed, automatic soldering.

It is another object of the invention to provide a solder flux the residue of which is non-conducting and which will not impair or reduce the efficiency of lamp base insulation.

It is a further object of the invention to provide a solder flux composition which leaves a resinous residue which is not unsightly or discolored and which will not attack the solder joint or the adjacent metal parts.

Briefly stated, in accordance with one aspect of our invention, we have discovered that the above objects can be accomplished by incorporating as little as 2% and as much as 10% by weight of a hydrohalide derivative of 2-ethylhexylamine in rosin solutions. We have discovered further that the addition of about 1% to about 10% by weight of linseed oil, either raw or boiled, will further improve the appearance of the residues left by this flux composition and in addition will improve the flow characteristics of the solder. We have further discovered that the addition of a trace of silicone oil will further enhance the improvement produced by the linseed oil addition and also performs as an excellent anti-foam agent in the solder flux composition.

By way of specific example, one particular embodiment of the invention is illustrated in the following formula.

| | Percent by weight |
|---|---|
| 2-ethylhexylamine hydrochloride | 3.55 |
| Rosin solids | 46.70 |
| Denatured alcohol (Synasol) | 43.20 |
| Linseed oil (raw) | 6.55 |

Silicone oil, 1 part per 16,000 parts flux.

We have found that all the hydrohalide derivatives of 2-ethylhexylamine are very active fluxes on copper and copper alloys either per se, in water, in alcohol, or in rosin solutions. The hydrofluoride salt will, in addition, flux aluminum.

2-ethylhexylamine refers to the compound

$$C_4H_9CH(C_2H_5)CH_2NH_2.$$

The number "2" refers to the fact that the ethyl group, $C_2H_5$, is linked to the second carbon atom from the amine, $NH_2$, group. The amine will react mole for mole with concentrated or diluted acids such as hydrochloric, hydrobromic, hydrofluoric and hydroiodic acid to produce the amine hydrochloride, hydrobromide, hydrofluoride or hydroiodide salt. When the acids react with the amine, heat is evolved. Reaction is most violent with hydrofluoric acid, least violent with hydroiodic acid. The water normally present in the acids is boiled off leaving, after cooling, waxy solids. These solids, the 2-ethylhexylamine hydrohalides, are soluble in water or in lower alcohols and other well known solvents, and are compatible with rosin and similar resins, such as polymerized wood rosins.

We have prepared solder flux compositions producing excellent results containing preferred amounts of ingredients ranging from about 2 to about 10 percent by weight hydrohalide derivatives of 2-ethylhexylamine, about 30 to 60 percent by weight rosin solids and about 68 to 30 percent by weight denatured alcohol as illustrated in Examples A, B and C following.

*Example A*

| | Percent by weight |
|---|---|
| 2-ethylhexylamine hydrofluoride | 2 |
| Rosin solids | 30 |
| Alcohol (denatured) | 68 |

*Example B*

| | |
|---|---|
| 2-ethylhexylamine hydrobromide | 6 |
| Rosin solids | 45 |
| Alcohol (denatured) | 49 |

Example C

| | |
|---|---|
| 2-ethylhexylamine hydrochloride | 10 |
| Rosin solids | 60 |
| Alcohol (denatured) | 30 |

Fluxes which produce the desired result were prepared and tested over a wide range of percentage compositions. For example, the rosin solids content of the composition was varied from 10 to 90 percent by weight producing a flux of good properties throughout the entire range. In addition, the hydrohalide salts were substituted one for another in equal parts by weight and produced uniformly good results. For example, the hydroiodide salts can be substituted in equal parts by weight for the hydrohalides of Examples A, B or C. Many solvents were found to be entirely satisfactory as substitutes for the lower alcohols. Flux compositions of the desired properties were produced with such aliphatic solvents a naphthas, glycol ethers, etc., and such aromatic solvents as toluene, benzene, xylene, etc. Compatible mixtures of the aliphatics and aromatics in any combination also produced the desired result. Example D illustrates a flux composition according to the invention employing a mixture of aliphatic and aromatic solvents, while Example E illustrates a flux employing an aliphatic glycol ether.

Example D

| | Percent by weight |
|---|---|
| 2-ethylhexylamine hydrochloride | 3.4 |
| Rosin solids | 40.5 |
| Naphtha | 44.5 |
| Toluene | 11.6 |

Example E

| | |
|---|---|
| 2-ethylhexylamine hydrochloride | 3.55 |
| Rosin solids | 46.7 |
| Ethylene glycol monoethyl ether | 43.2 |
| Linseed oil | 6.55 |

We further found that a preferred range of about 2½ to about 5 percent by weight of the 2-ethylhexylamine hydrochloride, hydrobromide, hydroiodide and hydrofluoride in a rosin-alcohol flux containing from about 30 to about 60 percent rosin produced excellent activated rosin-alcohol fluxes which leave no corrosive residues on copper, copper alloys or aluminum. These fluxes may be prepared according to the following examples.

Example F

| | Percent by weight |
|---|---|
| 2-ethylhexylamine hydroiodide | 2.5 |
| Rosin solids | 30 |
| Alcohol (denatured) | 67.5 |

Example G

| | |
|---|---|
| 2-ethylhexylamine hydrobromide | 3.5 |
| Rosin solids | 40 |
| Alcohol (denatured) | 56.5 |

Example H

| | |
|---|---|
| 2-ethylhexylamine hydrochloride | 5 |
| Rosin solids | 60 |
| Alcohol (denatured) | 35 |

In the preferred flux composition, as in the previous examples, the hydrohalide salts are completely interchangeable in equal amounts to produce the desired results.

The fluxes of our invention leave a non-corrosive residue around the soldered joint which is generally a solid film of rosin varnish remaining on the base metal surface after the soldering operation. Occasionally a crazing or cracking of this solid rosin varnish film was observed. In order to preserve the smooth film, small amounts of plasticizers were added to the flux without any improved results. Carbitol phthalate, di-octyl phthalate, di-butyl phthalate, tri-cresyl phosphate and other plasticizers were added without beneficial effect on the rosin varnish film.

The addition of linseed oil, either raw or boiled, was found to completely eliminate the cracking of the rosin varnish film. In addition, an unforeseen effect was produced by the linseed oil in that the solder flow characteristics were considerably improved resulting in quicker and better soldered joints.

We found that linseed oil additions of less than about 1% by weight produced very little effect and in excess of 15% by weight, while preventing cracking of the rosin film, would not dry hard upon cooling after making the soldered joint. About 7% by weight linseed oil in the solder flux appears to be the optimum amount to produce the desired solid rosin varnish film and optimum increase in flow characteristics of the solder.

A trace of silicone oil in the flux composition was also found to improve the appearance of the residue film and further acted as an excellent anti-foam agent. Many types of silicone oil were tried with equal success and the viscosity of any particular oil used appeared to be of no significance. Broadly, the methylchlorosilane derivatives produced maximum beneficial effects. The methylchlorosilane copolymers worked equally well regardless of the viscosity or degree of copolymerization. Specifically, the commercially available silicone oil designated SF96(40) produced the desired effect in all flux formulations.

Thus, improved flux compositions can be produced according to the following examples:

Example I

| | Percent by weight |
|---|---|
| 2-ethylhexylamine hydrochloride | 3.55 |
| Rosin solids | 44.20 |
| Alcohol (denatured) | 37.25 |
| Linseed oil (raw) | 15.00 |
| Silicone oil, 1 part per 10,000 parts flux. | |

Example J

| | |
|---|---|
| 2-ethylhexylamine hydrobromide | 6.55 |
| Rosin solids | 50.00 |
| Alcohol (denatured) | 36.90 |
| Linseed oil (boiled) | 6.55 |
| Silicone oil, 1 part per 16,000 parts flux. | |

Example K

| | |
|---|---|
| 2-ethylhexylamine hydrofluoride | 7.45 |
| Rosin solids | 34.20 |
| Alcohol (denatured) | 57.35 |
| Linseed oil (raw) | 1.00 |
| Silicone oil, 1 part per 20,000 parts flux. | |

A solder flux composition according to the invention may be prepared in the following manner. Slowly add 190 grams of 42% hydrofluoric acid to 400 milliliters of de-ionized water in a stainless steel beaker, stirring until the materials are thoroughly mixed. Activator solution A may then be prepared by placing 654 milliliters of 2-ethylhexylamine in a stainless steel beaker and slowly adding the diluted acid. After the addition of the acid the mixture should be stirred until the amine is completely reacted. This solution is then boiled slowly until the net weight of solution remaining is between 615 and 635 grams. This will take place in approximately 1½ hours. Maximum temperature of the solution should not exceed about 106° to 108° C. Allow the solution to cool before using.

Solution B may then be prepared by adding 3480 milliliters of denatured alcohol to about 850 grams of the activator solution A and agitating until the activator is completely dissolved, which will require approximately 2 hours.

Solution C is then prepared by adding 7800 grams of rosin to 6390 milliliters of denatured alcohol and mechanically stirring until the rosin is completely dissolved. The final flux may then be prepared by adding 2600 grams of solution B to 13,000 grams of solution C and mechanically mixing for approximately 10 minutes. Add 1092 grams linseed oil (either raw or boiled) to the mixture of solutions B and C, add about 1 milliliter of silicone fluid and stir mechanically until thoroughly mixed.

Although a preferred embodiment of our invention has been disclosed, it is recognized that variations and changes may be made therein within the spirit and scope of the invention as defined by the appended claims. It is understood further that the ingredients, and their proportions as given above, can be varied, independently and in relation to each other, within fairly wide limits to obtain the desired results.

What we claim as new and desire to secure by Letters Patent of the United States is:

1. A solder flux composition consisting essentially of about 2 to about 10 percent by weight hydrohalide derivative of 2-ethylhexylamine, about 10 to about 90 percent by weight rosins and a suitable solvent therefor.

2. A solder flux composition consisting essentially of about 2 to about 10 percent by weight hydrohalide derivative of 2-ethylhexylamine, about 10 to about 90 percent by weight rosins in a solvent therefor selected from the group consisting of alcohol, naphtha, glycol ether, toluene, benzene, xylene and mixtures thereof.

3. A solder flux composition consisting essentially of about 2 to about 10 percent by weight hydrohalide derivative of 2-ethylhexylamine, about 30 to about 60 percent by weight rosins and about 68 to about 30 percent by weight alcohol.

4. A solder flux composition of the character described in claim 3 to which is added about 1 to about 15 percent by weight linseed oil and about 1 part silicone oil to about 10,000 to 20,000 parts flux.

5. A solder flux composition of the character described in claim 3 to which has been added about 5 to about 10 percent by weight linseed oil and about 1 part silicone oil to about 16,000 parts flux.

6. A solder flux composition consisting essentially of about 2.5 to about 5 percent by weight hydrohalide derivative of 2-ethylhexylamine, about 30 to about 60 percent by weight rosin and about 67.5 to about 35 percent by weight alcohol.

7. A solder flux composition of the character described in claim 6 to which is added about 1 to about 15 percent by weight linseed oil and about 1 part silicone oil to about 10,000 to 20,000 parts flux.

8. A solder flux composition of the character described in claim 6 to which is added about 5 to about 10 percent by weight linseed oil and about 1 part silicone oil to about 16,000 parts flux.

9. A solder flux composition consisting essentially of about 2.5 to about 5 percent by weight 2-ethylhexylamine hydrochloride, about 30 to about 60 percent by weight rosin, about 67.5 to about 35 percent by weight denatured alcohol, about 5 to about 10 percent by weight linseed oil and about 1 part silicon oil to about 16,000 parts flux.

10. A solder flux composition consisting essentially of about 2.5 to about 5 percent by weight 2-ethylhexylamine hydrobromide, about 30 to about 60 percent by weight rosin, about 67.5 to about 35 percent by weight denatured alcohol, about 5 to about 10 percent by weight linseed oil and about 1 part silicone oil to about 16,000 parts flux.

11. A solder flux composition consisting essentially of about 2.5 to about 5 percent by weight 2-ethylhexylamine hydrofluoride, about 30 to about 60 percent by weight rosin, about 67.5 to about 35 percent by weight alcohol, about 5 to about 10 percent by weight linseed oil and about 1 part silicone oil to about 16,000 parts flux.

12. A solder flux composition consisting essentially of about 2.5 to about 5 percent by weight 2-ethylhexylamine hydroiodide, about 30 to about 60 percent by weight rosin, about 67.5 to about 35 percent by weight alcohol, about 5 to about 10 percent by weight linseed oil and about 1 part silicone oil to about 16,000 parts flux.

13. A solder flux composition consisting essentially of 3.55 percent by weight 2-ethylhexylamine hydrochloride, 46.7 percent by weight rosin, 43.2 percent by weight denatured alcohol, 6.55 percent by weight linseed oil and about 1 part silicone oil per 16,000 parts flux.

References Cited in the file of this patent

UNITED STATES PATENTS

| | | |
|---|---|---|
| 1,980,367 | Auer | Nov. 13, 1934 |
| 2,250,940 | Zahn et al. | July 29, 1941 |
| 2,438,096 | Poor et al. | Mar. 16, 1948 |
| 2,483,598 | Schrank | Oct. 4, 1949 |

OTHER REFERENCES

Paint, Oil and Chemical Review, page 10, July 18, 1929.
The Condensed Chemical Dictionary, page 431, 3rd ed., 1942.
Fiat Final Report No. 1168 PB 81284, Office of Technical Services, May 30, 1947, 10 page report.